United States Patent [19]

Yamanishi et al.

[11] Patent Number: 5,508,016

[45] Date of Patent: Apr. 16, 1996

[54] PROCESS FOR PRODUCTION OF TRANSITION ALUMINA

[75] Inventors: Osamu Yamanishi; Seiichi Hamano, both of Niihama, Japan

[73] Assignee: Sumitomo Chemical Co., Ltd., Osaka, Japan

[21] Appl. No.: 219,875

[22] Filed: Mar. 30, 1994

Related U.S. Application Data

[63] Continuation of Ser. No. 991,753, Dec. 17, 1992, abandoned.

[30] Foreign Application Priority Data

Dec. 18, 1991 [JP] Japan ..................... 3-334834

[51] Int. Cl.$^6$ ..................................................... C01F 7/02
[52] U.S. Cl. ............................................. 423/625
[58] Field of Search ..................... 423/625, 137, 423/628

[56] References Cited

U.S. PATENT DOCUMENTS

| | | | |
|---|---|---|---|
| 2,773,741 | 12/1956 | Antonsen | 423/625 |
| 3,406,228 | 10/1968 | Hardy et al. | 423/628 |
| 4,052,417 | 10/1977 | Slinkard et al. | 502/209 |
| 4,282,117 | 8/1981 | Muramoto et al. | 423/592 |
| 5,155,085 | 10/1992 | Hamano et al. | 502/303 |

FOREIGN PATENT DOCUMENTS

| | | | |
|---|---|---|---|
| 576635 | 5/1959 | Canada | 423/625 |
| 724082 | 12/1965 | Canada | 423/625 |
| 2419544 | 6/1975 | Germany | 423/625 |
| 17-16934 | 9/1942 | Japan . | |
| 50-21319 | 7/1975 | Japan . | |
| 60-171220 | 9/1985 | Japan | 423/628 |
| 563636 | 8/1944 | United Kingdom | 423/625 |

OTHER PUBLICATIONS

Gendai–(Kogyo) Kagaku–Koza 18, Inorganic Synthetic Chemistry II, p. 113 and FIG. 9.42 (no date).

"Preparation of Catalytically Active γ–$Al_2O_3$ from a Basic Aluminum Succinate Precursor Precipitated from Homogeneous Solution" by Ch. Sivaraj et al, Applied Catalysts, 24 (1986) 25–35, no month.

Ceramics, vol. 24, No. 11, pp. 1042–1043, 1989, no month.

Chemical Handbook–Applied Chemistry II (Materials), 3rd Edition, p. 865 and Table 11.25, no date.

"Formation Process of Alumina by Thermal Decomposition of Aluminum Sulfate" by S. Kato et al, Yogyo–Kyokai–Shi 11 (2), 1969, no month.

*Primary Examiner*—Steven Bos
*Attorney, Agent, or Firm*—Birch, Stewart, Kolasch & Birch

[57] ABSTRACT

There is provided a process for the production of a transition alumina by thermally decomposing an aluminum sulfate wherein the thermal decomposition is carried out under an atmosphere comprising a reducing substance, and the transition alumina produced by the process has a specific BET surface are of not smaller than 400 m$^2$/g.

2 Claims, No Drawings

1

PROCESS FOR PRODUCTION OF TRANSITION ALUMINA

This application is a continuation, of application Ser. No. 07/991,753, filed on Dec. 17, 1992, now abandoned.

BACKGROUND OF THE INVENTION

1. Field of the Invention

The present invention relates to a process for the production of a transition alumina having a larger specific surface area for applications of, for example, desiccants, absorbents, catalysts and catalyst supports.

2. Description of the Related Art

The transition alumina has been widely used for various applications such as the desiccants, the absorbents, the catalysts and the catalyst supports, and it is expected to be used for further applications.

From view points of increase of an absorbent capacity for water or an intended absorbed component and effective application of the catalysts, the transition alumina used for the above applications is required to have a larger specific surface area.

Conventionally known process for the production of the transition alumina includes a process as described in Japanese Patent Kokoku Publication No. 21319/1975 in which alumina hydroxide produced by the Bayer's process is thermally decomposed in an air flow at an elevated temperature, a process as described in Applied Catalysis, Vol. 24, pp. 25–35, 1986 in which an aluminum salt or an aluminate is hydrolyzed to produce an amorphous alumina gel and the resultant alumina gel is calcined and a process as described in Ceramics, Vol. 24, No. 11, pp. 1042–1047, 1989 in which an aluminum alkoxide is hydrolyzed and calcined. The transition alumina produced by the above processes has a specific surface area of not larger than 350 m²/g.

Even a commercially available transition alumina having the largest specific surface area has a specific surface area of about 340 m²/g as described in Table 11.25 of Chemical Society of Japan, Chemical Handbook-Applied Chemistry II (Materials), 3rd ed., Maruzen, Tokyo, p. 865.

On the other hand, a process for the production of the transition alumina in which an aluminum sulfate is thermally decomposed is known from, for example, Japanese Patent Kokoku Publication No. 16934/1967, Yogyo Kyokai Shi (J. Ceram. Ass. Jpn.), Vol. 77, No. 2, pp. 60–65, 1969 and Gendai-Kagaku-Koza 18, Inorganic Synthetic Chemistry II, Kyoritsu-Shuppan, Tokyo, p. 113.

Gendai-Kagaku-Koza 18, Inorganic Synthetic Chemistry II, p. 113 describes that the alumina produced by the process described therein comprising thermal decomposition at a temperature of about 900° C. has a specific surface area of about 170 m²/g.

SUMMARY OF THE INVENTION

In view of the above prior art, the present inventors have made extensive studies in order to find a process for the production of the transition alumina having a larger specific surface area which is economically produced in an industrial scale, and surprisingly have found that the transition alumina having the larger specific surface area as a BET specific surface area is produced when an aluminum sulfate is thermally decomposed under a specific atmosphere even at a relatively low temperature.

Thus, the present invention provides a process for the production of a transition alumina by thermally decomposing an aluminum sulfate characterized in that the thermal decomposition is carried out under an atmosphere comprising a reducing substance.

DETAILED DESCRIPTION OF THE INVENTION

The present process will be, hereinafter, described in detail.

An aluminum sulfate used in the present invention is not specifically limited, and is a commercially available aluminum sulfate in the form of a solid or a solution which is generally expressed by a following general formula:

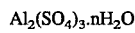

$$Al_2(SO_4)_3 \cdot nH_2O$$

wherein n is between 0 and 27. A basic aluminum sulfate or a basic aluminum sulfate salt may be also used.

In addition to the aluminum sulfate, other aluminum salt such as aluminum chloride, aluminum nitrate, aluminum formate, aluminum lactate and aluminum acetate, an alumina hydrate or an aluminum alkoxide may be combined provided that it does not cause remarkable reduction of the specific surface area of the produced transition alumina on the thermal decomposition.

In the case in which an aqueous aluminum sulfate solution is used as a starting material, when the aluminum sulfate is thermally decomposed, the aluminum sulfate solution may be heated under a reducing atmosphere from the beginning of the heating. Alternatively, the solution may be dried under any atmosphere before the reductive thermal decomposition of the aluminum sulfate. Namely, the solution may be heating dried under an oxidizing atmosphere, a reducing atmosphere or an inert atmosphere.

Any manner for the drying may be used. Thus, a known manner may be applied using, for example, an oven, an oil bath, a spray dryer, a fluidized bed dryer, a vacuum dryer, a kneader, a ribbon dryer or a paddle dryer. A drying temperature is not particularly limited, and it is usually not less than about 100° C. and lower than a thermal decomposition temperature of the aluminum sulfate.

A temperature at which the thermal decomposition treatment of the aluminum sulfate takes place under the reducing atmosphere is higher than the thermal decomposition temperature of the aluminum sulfate under the reducing atmosphere, but not higher than a transition temperature at which produced transition alumina is crystal transferred to α-alumina under the reducing atmosphere. Concretely, the thermal decomposition treatment is carried out under the atmosphere comprising the reducing substance at a temperature of about 200° C.–about 800° C. for a period of 0.1 sec.–24 hours, and preferably at a temperature of about 500° C.–about 700° C. for a period of 0.5 sec.–about 15 hours.

The reducing substance may be any substance provided that it reduces the aluminum sulfate, and it may be in the form of a gas or a solid. For example, hydrogen, ammonia, a hydrocarbon having carbon atoms of 3–4 such as propane, propylene, butene and butane, carbon monoxide, urea, melamine, cyanuric acid and biuret can be used. Especially, hydrogen, ammonia, propane or a propane mixture such as a liquefied petroleum gas (LPG) is recommendable from view points of its availability and ease of handling.

The reducing substance should be present in an amount which sufficiently reduces the aluminum sulfate so that the transition alumina is formed. The atmosphere under which the thermal decomposition treatment of the alumina sulfate is carried out may consist essentially of the reducing substance or it may be diluted with an inert gas such as nitrogen. Alternatively, the atmosphere during the thermal decomposition may comprise oxygen, and thus air may be combined with the atmosphere. When the atmosphere contains oxygen, an additional amount of the reducing substance is required in addition to the sufficient amount for the reduction of aluminum sulfate. The amount should be equal to or larger than a stoichiometric amount to completely consume oxygen. It is of course that oxygen should be present outside of an explosion range.

The transition alumina herein used is intended to mean an alumina which is usually referred to as "transition alumina" by those skilled in the art and which is a precursor on the way to α-alumina when an aluminum hydroxide is heated. Concretely, the transition alumina includes one which has a crystal form of $\gamma$, $\delta$, $\eta$, $\theta$, $\kappa$, $\rho$ or $\chi$, and especially one in the crystal form of $\delta$, $\theta$ or $\gamma$.

When the present process is carried out, a stabilizer such as a barium compound or a rare earth compound may be beforehand added to the aluminum sulfate for the improvement of heat resistance and/or a catalyst component such as a noble metal may be also beforehand added to the aluminum sulfate.

Any known manner is employed for the reductive thermal decomposition treatment of the aluminum sulfate. For example, a rotary kiln, instantaneous calcination, fluidized bed calcination, fixed bed calcination, a tunnel kiln, a batch furnace or a holding furnace may be used for the decomposition.

The alumina after the reductive decomposition treatment may be the transition alumina having a desired crystal form when thermal decomposition conditions such as a temperature and a period are selected properly. Alternatively, the alumina after the reductive decomposition treatment may be calcined separately so as to have the transition alumina having the desired crystal form.

The transition alumina so produced has a remarkably larger BET specific surface area usually more than about 400 $m^2/g$, typically more than about 450 $m^2/g$, and it may be used, as it is or after ground, as catalyst supports or fillers for resins, starting materials in the form of various types of desiccants, absorbents, catalysts or catalyst supports or catalyst supports coated on a surface of ready-made moldings such as a ceramic honeycomb.

As described above, the present invention provides the economical and simple process for the production of the transition alumina having the larger specific surface area previously unknown in which a cheap starting material such as an aluminum sulfate is used and the thermal decomposition is carried out under the atmosphere comprising the reducing substance at the relatively low temperature. Thus, the present invention is very valuable in its industrial point.

EXAMPLES

The present process will be, hereinafter, described in detail with reference to Examples, but the present invention is not limited by the following Examples.

Example 1

5 Grams of an aluminum sulfate $(Al_2(SO_4)_3 \cdot 16H_2O)$ having a reagent grade was charged in a U-shaped tube made of quartz glass having an internal volume of 100 ml. Hydrogen gas having a purity of 100 % was supplied from one end of the U-shaped tube at a flow rate of 200 Ncc/min. and an exhaust gas was purged from the other end of the tube. Then, the alumina sulfate contained in the tube was heated from a room temperature to a temperature of 550° C. at a temperature increasing rate of about 250° C./hour while hydrogen is supplied at the flow rate and kept at a temperature of 550° C. for 4 hours to thermally and reductively decompose the aluminum sulfate to produce a transition alumina (most of which was found to be γ-alumina by X-ray diffractometry). The resultant transition alumina had a specific surface area of 452 $m^2/g$ measured by the BET method.

Examples 2 and 3

Two sets of the substance and the apparatus having the same conditions as in Example 1 were prepared and the aluminum sulfate was heated to a temperature of 600° C. (Example 2) or 650° C. (Example 3) and kept at the temperature for 4 hours while hydrogen was supplied as in Example 1, whereby the aluminum sulfate was thermally and reductively decomposed to the transition alumina (most of which was found to be γ-alumina by the X-ray diffractometry). When the specific surface area of the resultant transition alumina was measured as in Example 1 and found to have a specific surface area of 563 $m^2/g$ (Example 2) or 480 $m^2/g$ (Example 3).

Comparative Examples 1–3

Three sets of the same substance and the same apparatus as used in Example 1 was prepared and air was supplied in place of hydrogen in the procedure of Example 1. The substances were heated to temperatures of 500° C. (Comparative Example 1), 800° C. (Comparative Example 2) and 1000° C. (Comparative Example 3) and then kept at their temperature for 5 hours, respectively while the air was supplied, whereby the alumina sulfate was thermally decomposed to produce the transition alumina. The resultant transition alumina had a specific surface areas of 5 $m^2/g$ (Comparative Example 1), 50 $m^2/g$ (Comparative Example 2) and 120 $m^2/g$ (Comparative Example 3), respectively.

Example 4

Using the same substance and the same apparatus as in Example 1, the transition alumina was produced with heating the substance to a temperature of 600° C. and keeping the temperature for 4 hours while supplying a liquefied petroleum gas (containing 99% by volume of propane) at a flow rate of 200 Ncc/min. at a normal pressure. The resultant transition alumina (most of which was found to be γ-alumina by the X-ray diffractometry) had a specific surface area of 436 $m^2/g$.

Example 5

Using the same substance and the same apparatus as in Example 1, the transition alumina was produced with heating the substance to a temperature of 620° C. and keeping the temperature for 4 hours while supplying ammonia gas at a flow rate of 200 Ncc/min. The resultant transition alumina (most of which was found to be γ-alumina by the X-ray diffractometry) had a specific surface area of 410 $m^2/g$.

What is claimed is:

1. A process for the production of a transition alumina having a BET specific surface area of greater than 400 $m^2/gram$, comprising thermally decomposing an aluminum sulfate under an atmosphere comprising a reducing substance selected from the group consisting of hydrogen, ammonia, propane and a propane mixture, in an amount sufficient to reduce the aluminum sulfate to said transition alumina at a temperature of about 500° C. to about 700° C. and for a period of 0.5 seconds to about 15 hours.

2. A process for the production of a transition alumina having a BET specific surface area of greater than 400 m²/gram, comprising thermally decomposing an aluminum sulfate wherein the aluminum sulfate is thermally decomposed under an atmosphere comprising a reducing substance selected from the group consisting of hydrogen, ammonia, propane and a propane mixture, in an amount sufficient to reduce the aluminum sulfate to said transition alumina at a temperature of about 200° C. to about 700° C. and for a period of 0.1 seconds to 24 hours.

* * * * *